UNITED STATES PATENT OFFICE.

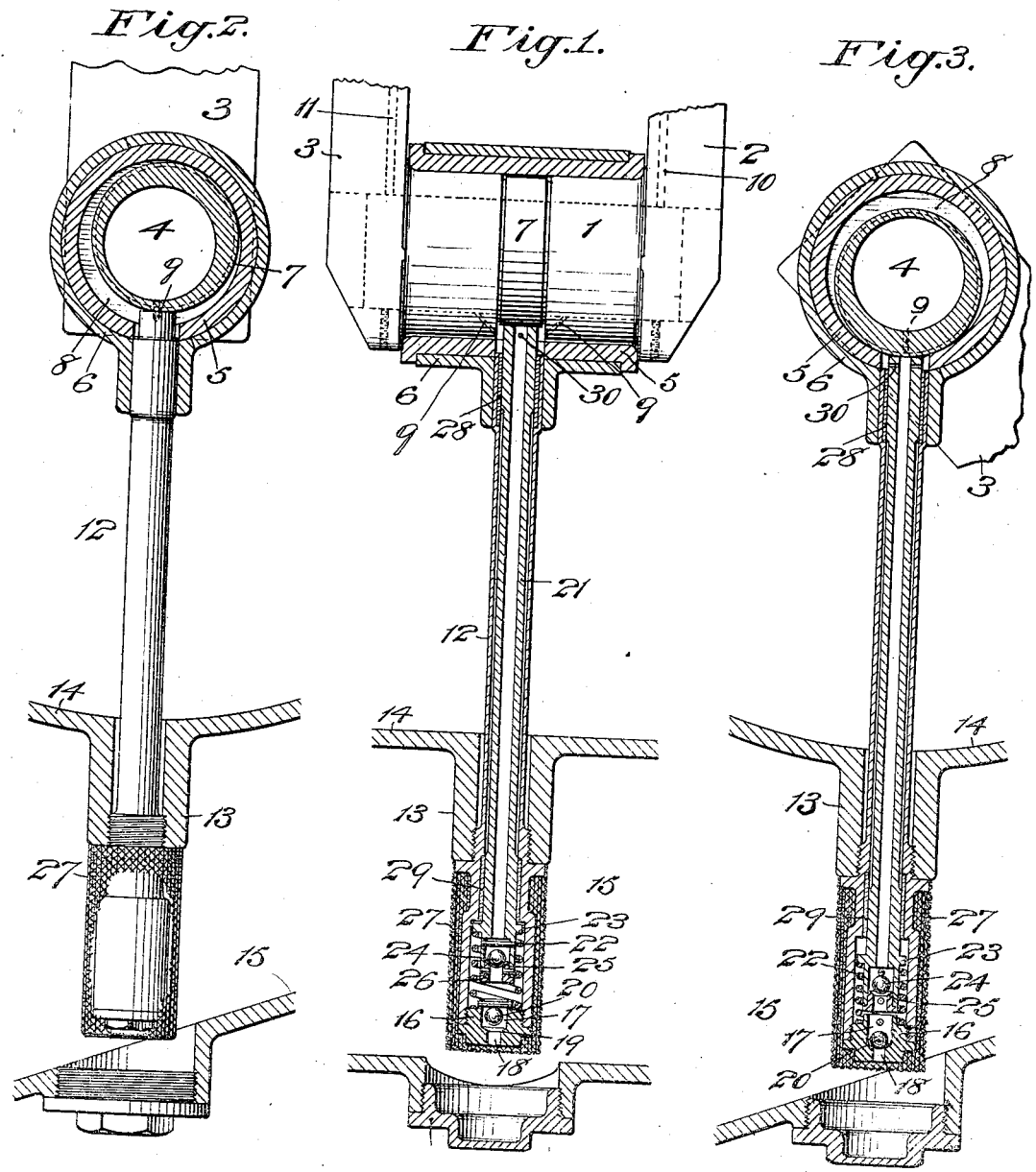

FINLEY R. PORTER, OF PORT JEFFERSON, NEW YORK, ASSIGNOR TO KNIGHT AMERICAN PATENTS COMPANY, OF CHICAGO, ILLINOIS, A CORPORATION OF DELAWARE.

OILING MECHANISM FOR ROTARY SHAFTS.

1,308,916.            Specification of Letters Patent.     Patented July 8, 1919.

Application filed September 16, 1916. Serial No. 120,561.

*To all whom it may concern:*

Be it known that I, FINLEY R. PORTER, a citizen of the United States, and resident of Port Jefferson, in the county of Suffolk and State of New York, have invented a new and useful Improvement in Oiling Mechanisms for Rotary Shafts, of which the following is a specification.

The object of my invention is to provide a very simple and effective oiling mechanism for rotary shafts, whereby an ample supply of oil is insured to the bearings at all speeds of the shaft, the pump rod of the oil pump being reciprocated by direct engagement with the face of an eccentric formed in the shaft itself between the ends of the bearing for the shaft at this point, the formation of the eccentric producing an annular oil space around the shaft into which the oil is forced from the oil reservoir through the pump rod. The shaft may also be hollow and communicate with the annular oil space around the eccentric, whereby oil may be supplied to the interior of the shaft to be led therefrom to different sources, as, for instance, the piston rod bearings, where the invention is applied to crank shafts.

A practical embodiment of my invention is represented in the accompanying drawings, in which, Figure 1 represents in side elevation, a portion of a crank shaft with my improved oiling mechanism applied thereto, the oiling mechanism being shown in longitudinal central section.

Fig. 2 is a transverse section through the crank shaft at the eccentric, the oiling mechanism being shown in side elevation, and Fig. 3 is a transverse section through the crank shaft and oiling mechanism, showing the eccentric in a different position than that shown in Figs. 1 and 2.

A portion only of a crank shaft 1, is shown in the accompanying drawings, together with portions of the adjacent crank arms 2 and 3. The crank shaft is shown as hollow, the chamber therein being denoted by 4. The bearing bushing 5 for the crank shaft extends between the crank arms 2 and 3, and is carried by a suitable support 6, embracing the bearing bushing.

An eccentric 7 is formed in the crank shaft 1, between the ends of the bearing bushing 5, providing a crescent shaped oil space 8. Ducts 9 in the crank shaft serve to bring the crescent shaped oil space 8 into open communication with the interior of the hollow crank shaft. Ducts 10, 11, in the crank arms 2, 3, lead from the chamber 4 to any desired point, as, for instance, the piston rod bearings, not shown herein.

A tubular guide 12 is supported at its upper end by a support 6, and at its lower end by a hollow boss 13 depending from the top 14 of the oil reservoir 15. The lower end of this tubular guide is provided with a screw-cap 16 having enlarged and reduced bores 17, 18, therein, forming a seat 19 for the ball check valve 20.

A hollow pump rod 21, reciprocates in the tubular guide 12, the upper end of which pump rod is held in engagement with the face of the crank shaft eccentric 7, by a coil spring 22, interposed between the cap 16 and an annular shoulder 23, near the lower end of the said hollow pump rod. The lower end of this hollow pump rod is provided with a ball check valve 24, normally resting on a seat 25 provided by a tubular sleeve 26 secured to the lower end of the said tubular pump rod. A wire mesh strainer 27 may surround the lower ends of the tubular guide 12, and tubular pump rod 21. Upper and lower bearing bushings 28, 29, may be provided in the tubular guide 12, for the tubular pump rod 21. Ducts 30 may be provided at the upper end of the tubular pump rod for insuring open communication between the bore of the pump rod and the crescent shaped oil space 8, at all times.

I have described this oiling mechanism as applied to a crank shaft, but it is obvious that it could be applied to rotary shafts of any character.

From the above description it will be seen that by forming the pump operating eccentric in the shaft itself, I am enabled to materially simplify the oiling mechanism and at the same time provide an ample oil space at the bearing for the shaft. Furthermore by the construction described I obtain a double pumping action: first, the forcing of oil into the crescent shaped space 8 and hollow interior 4 of the shaft 1 and second, a further pressure impulse given to the oil confined in the crescent shaped space and the hollow shaft by the rise of the pump rod into the crescent shaped oil space. Because of the close fit of the parts some little pressure is necessary to force the oil into the several bearings to be lubricated. As the shaft begins to rotate oil rises rapidly into the tubular rod 21 and thence into the crescent shaped space 8 and hollow shaft 4, which soon become filled with oil under pressure, the pressure being constantly relieved to some extent by the flow of oil to the bearings. In my construction the movement of the pump rod into the crescent shaped space 8 on the upstroke of the rod displaces a certain amount of oil, pushing it through the ducts 9 and thus assisting in maintaining the proper oil pressure necessary for effective lubrication.

It will also be seen that the device is positive in its operation and also absolutely protected.

What I claim is:

1. A shaft oiler including a rotary shaft, its bearing, an eccentric formed in the shaft between the ends of the bearing, providing a crescent shaped oil space, a pump operated by the eccentric including a pump rod for forcing oil into said space, and means for holding the upper end of said rod engaged with the face of the eccentric.

2. A shaft oiler including a rotary hollow shaft, its bearing, an eccentric formed in the shaft between the ends of the bearing, providing a crescent shaped oil space communicating with the interior of the shaft, a pump operated by the eccentric including a pump rod for forcing oil into said space and thence into the interior of the shaft, and means for holding the upper end of said rod engaged with the face of the eccentric.

3. A shaft oiler including a rotary shaft, its bearing, an eccentric formed in the shaft between the ends of the bearing, providing a crescent shaped oil space, a pump operated by the eccentric including a hollow pump rod communicating with said space and means for holding the upper end of said rod engaged with the face of said eccentric.

4. A shaft oiler including a rotary hollow shaft, its bearing, an eccentric formed in the shaft between the ends of the bearing, providing a crescent shaped oil space communicating with the interior of the shaft, a pump operated by the eccentric including a hollow pump rod communicating with said space and means for holding the upper end of said rod engaged with the face of said eccentric.

5. A shaft oiler including a rotary shaft, its bearing, an eccentric formed in the shaft between the ends of the bearing, providing a crescent shaped oil space, a pump operated by said eccentric, including a fixed guide and a hollow pump rod reciprocable therein, communicating with said space, and means for holding the end of the rod engaged with said eccentric.

6. A shaft oiler including a rotary hollow shaft, its bearing, an eccentric formed in the shaft between the ends of the bearing, providing a crescent shaped oil space communicating with the interior of the shaft, a pump operated by said eccentric including a fixed guide and a hollow pump rod reciprocable therein, communicating with said space, and means for holding the end of the rod engaged with said eccentric.

7. A shaft oiler including a rotary shaft, its bearing, an eccentric formed in the shaft between the ends of the bearing, providing a crescent shaped oil space, an oil reservoir, a pump operated by the eccentric including a fixed guide, a hollow pump rod reciprocable therein, extending from the reservoir to said oil space, and means for holding the end of the pump rod engaged with the face of the eccentric.

8. A shaft oiler including a rotary hollow shaft, its bearing, an eccentric formed in the shaft between the ends of the bearing, providing an annular oil space communicating with the interior of the shaft, an oil reservoir, a pump operated by the eccentric including a fixed guide, a hollow pump rod reciprocable therein, extending from the reservoir to said oil space, and means for holding the end of the pump rod engaged with the face of the eccentric.

9. The combination with a shaft, of a stationary sleeve surrounding said shaft, said shaft being provided with an eccentric within said sleeve, said sleeve having an opening opposite the eccentric, a pump rod reciprocable through said opening, and means for holding one end of said pump rod in engagement with the eccentric.

10. In combination, a shaft provided with an eccentric, a pump having a reciprocable pump rod, a supporting and guiding element mounted upon a concentric portion of said shaft, said element comprising a guide through which the pump rod reciprocates, and means tending to hold one end of said pump rod in contact with the eccentric.

11. In combination with a hollow rotary shaft, a sleeve surrounding said shaft, an eccentric formed in said shaft within the sleeve, whereby a crescent shaped oil chamber is provided; said shaft having passages connecting the interior thereof with the said chamber, means for forcing oil into said chamber and means coöperating with said eccentric to force oil from said chamber into the interior of said hollow shaft.

12. In combination with a hollow rotary shaft, a sleeve surrounding said shaft, an eccentric formed in said shaft within the sleeve whereby a crescent shaped oil chamber is provided; said shaft having passages connecting the interior thereof with the said chamber, means for forcing oil into said chamber, said means including a reciprocating pump rod, one end of which extends through said sleeve opposite said eccentric and is resiliently held in engagement with said eccentric, said rod coöperating with said eccentric to force oil from the crescent shaped oil chamber into the interior of said hollow shaft.

13. In combination with a rotary shaft, a sleeve surrounding said shaft, an eccentric formed in said shaft within the sleeve whereby a crescent shaped oil chamber is provided, means for forcing oil into said chamber, said means including a reciprocating pump rod, one end of which extends through said sleeve opposite said eccentric and is resiliently held in engagement with said eccentric, said rod coöperating with said eccentric to force oil from the crescent shaped oil chamber to the parts to be lubricated.

14. In combination, a rotary hollow shaft, a sleeve surrounding said shaft, an eccentric formed in the shaft within the sleeve, said eccentric being of less diameter than the diameter of the shaft whereby a crescent shaped space is provided between the eccentric and sleeve, said shaft having passages connecting the interior thereof with said crescent shaped space, a pump including a pump rod reciprocable through an opening in the sleeve opposite said eccentric, means tending to hold the upper end of said rod in contact with the said eccentric, said pump including means in connection with the pump rod for forcing oil into said crescent shaped space and hollow shaft upon the down stroke of the pump rod, said rod upon its upstroke entering said crescent shaped space and displacing oil whereby a further impulse is given to the oil within the hollow shaft.

15. In combination, a rotary shaft, a sleeve surrounding said shaft, an eccentric formed in the shaft within the sleeve, said eccentric being of less diameter than the diameter of the shaft, whereby a crescent shaped space is provided between the eccentric and sleeve, a pump including a pump rod reciprocable through an opening in the sleeve opposite said eccentric, means tending to hold the upper end of said rod in contact with said eccentric, said pump including means in connection with the pump rod for forcing oil into said crescent shaped space upon the down stroke of the pump rod, said rod upon its upstroke entering said crescent shaped space, thereby forcing oil therefrom to the parts to be lubricated.

In testimony, that I claim the foregoing as my invention, I have signed my name this 5th day of September 1916.

FINLEY R. PORTER.

Copies of this patent may be obtained for five cents each, by addressing the "Commissioner of Patents, Washington, D. C."